(12) United States Patent  (10) Patent No.: US 8,159,557 B2
Lee et al.  (45) Date of Patent: Apr. 17, 2012

(54) METHOD OF GENERATING A GAIN OF AN IMAGE FRAME

(75) Inventors: Yuan-Che Lee, Taichung (TW); Jhy-Jyi Sze, Tainan (TW); Chiao-Fu Chang, Taichung (TW); Tsung-Chien Wu, Hualien County (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 601 days.

(21) Appl. No.: 12/236,492

(22) Filed: Sep. 23, 2008

(65) Prior Publication Data

US 2010/0073528 A1   Mar. 25, 2010

(51) Int. Cl.
*H04N 5/235* (2006.01)

(52) U.S. Cl. .................... 348/229.1; 348/230.1
(58) Field of Classification Search .............. None
See application file for complete search history.

(56) References Cited

U.S. PATENT DOCUMENTS

| 6,342,919 B2 | 1/2002 | Opris |
| 6,660,989 B2 | 12/2003 | Guo et al. |
| RE42,555 E * | 7/2011 | Lin et al. ............ 348/252 |
| 2003/0038983 A1 | 2/2003 | Tanabe et al. |
| 2007/0046596 A1* | 3/2007 | Sakakibara et al. ....... 345/87 |

OTHER PUBLICATIONS

S.-W. Han et al., Area-efficient correlated double sampling scheme with single sampling capacitor for CMOS image sensors, Mar. 16, 2006, vol. 42 No. 6, Electronics Letters.
Hsiao-Hui Tong , Design of A Fixed Pattern Noise Reduction Circuit for CMOS Image Sensor Array, 2002, p. 1-6.
Marc J. Loinaz et al., A 200-mW, 3.3-V, CMOS Color Camera IC Producing 352×288 24-b Video at 30 Frames/s, Dec. 1998, p. 2092-2103, vol. 33, No. 12, IEEE Journal of Solid-State Circuits.

* cited by examiner

*Primary Examiner* — David Ometz
*Assistant Examiner* — Angel L Garces-Rivera
(74) *Attorney, Agent, or Firm* — Winston Hsu; Scott Margo

(57) ABSTRACT

A method of generating a gain of an image frame according to a look up table of gain which is set up based on luminance sensitivity of human eyes is proposed. The method includes setting a gain of an image frame to 1, scanning images of a plurality of front rows of the image frame, averaging the images of the plurality of the front rows of the image frame to generate an average value of the images of the plurality of the front rows of the image frame, finding a gain from the look up table of gain according to the average value of the images of the plurality of the front rows of the image frame, and adjusting remaining rows of the image frame according to the gain to generate images of the remaining rows of the image frame.

9 Claims, 7 Drawing Sheets

METHOD OF GENERATING A GAIN OF AN IMAGE FRAME

BACKGROUND OF THE INVENTION

1. Field of the Invention

The present invention relates to a method for generating a gain of an image frame, especially to a method for generating a gain of an image frame according to the luminance sensitivity of human eyes.

2. Description of the Prior Art

When a person watches an object, his visual system is analyzing chrominance and luminance at the same time. However, his analyses may be affected by the ambient environment. For example, when the person is in a bright environment, his visual system is sensitive to the chrominance of the object, yet insensitive to the luminance of the object. On the contrary, when a person is in a dark environment, his visual system is sensitive to the luminance of the object, yet insensitive to the chrominance of the object. That is, when the person is in a bright environment, his ability to analyze colors is better than his ability to analyze brightness; contrarily, when in a dark environment, his ability to analyze brightness is better than his ability to analyze colors. Please refer to FIG. 1. FIG. 1 illustrates three different luminance sensitivity curves of three different human eyes. The vertical axis in FIG. 1 represents the luminance of an image frame (unit: cd/(m^2)), and the horizontal axis in FIG. 1 represents the gray levels the human eyes sense (unit: LSB, Least Significant Bit). According to FIG. 1, when the luminance of the image frame changes from 0 to 50 cd/(m^2), the gray level the first eye senses changes from 1 to 111 (a difference of 100), and the gray level the third eye senses changes from 1 to 151 (a difference of 150). When the luminance of the image frame changes from 150 to 200 cd/(m^2), the gray level the first eye senses changes from 201 to 231 (a difference of 30), and the gray level the third eye senses changes from 221 to 241 (a difference of 20). Therefore FIG. 1 indicates that the human eyes are more sensitive to the luminance of the image frame when the luminance of the image frame is low, and less sensitive to the luminance of the image frame when the luminance of the image frame is high.

The CMOS image sensors which are widely used in optical devices have a problem of fixed pattern noise (FPN). The FPN is caused by differences between parameters of the optical device. Please refer to FIG. 2. FIG. 2 is an image with FPN equal to 2.41%. From FIG. 2, it can be seen that the potential difference resulted by FPN causes differences in brightness rather than in colors in columns and rows of an image frame.

Before an optical device such as a digital camera takes a picture, it has to perform focusing and light-metering for determining the gain of the image to be taken. Some cameras are even provided with an additional light-metering area for measuring the luminance of the scene. An image display such as an LCD TV usually has to display a test image frame and measure the luminance of the test image frame so as to determine the gain of the main image frame before the main image frame is displayed. After the gain is determined, the main image frame is displayed according to the gain. In order to determine the gain of the main image frame of a camera or an LCD TV, a test image frame or a light-metering area has to be spared. Therefore, both methods are not economical and efficient; moreover, the test image frame used for light-metering isn't the main image frame. As a result, this method is neither real-time nor efficient.

After light-metering, determine a corresponding gain from a look up table and use the gain to take a picture or display a main image frame. Conventionally the look up table of gain corresponds to an operation mode of the optical device, and is set up according to a mathematical average method. However, the luminance sensitivity of human eyes hasn't been considered when setting up the look up table. As a result, the look up table cannot provide a gain optimized for the environment, particularly when the ambient environment is extremely dark or bright, the gain provided by the look up table would be highly inappropriate.

SUMMARY OF THE INVENTION

According to an embodiment of the present invention, a method for generating a gain of an image frame comprises setting the gain of the image frame to 1, scanning images of a plurality of front rows of the image frame, averaging the images of the plurality of the front rows of the image frame to generate an average value of the images of the plurality of the front rows of the image frame, generating a corresponding gain according to the average value of the images of the plurality of the front rows of the image frame, and generating an image of remaining rows of the image frame according to information of the remaining rows of the image frame and the corresponding gain.

According to an embodiment of the present invention, a method for generating a gain of an image frame comprises scanning images of a plurality of front rows of the image frame, averaging the images of the plurality of the front rows of the image frame to generate an average value of the images of the plurality of the front rows of the image frame, generating a corresponding gain according to the average value of the images of the plurality of the front rows of the image frame and a gain of the image frame, and generating an image of remaining rows of the image frame according to information of the remaining rows of the image frame and the corresponding gain.

These and other objectives of the present invention will no doubt become obvious to those of ordinary skill in the art after reading the following detailed description of the preferred embodiment that is illustrated in the various figures and drawings.

DETAILED DESCRIPTION

To overcome the disadvantages of the prior art, the present invention provides a method using dummy rows of an image frame instead of a test image frame or a light-metering area for performing light-metering. Further the luminance sensitivity of human eyes is considered for setting up a look up table of gain, thus improving the look up table of the prior art.

Figure 1:
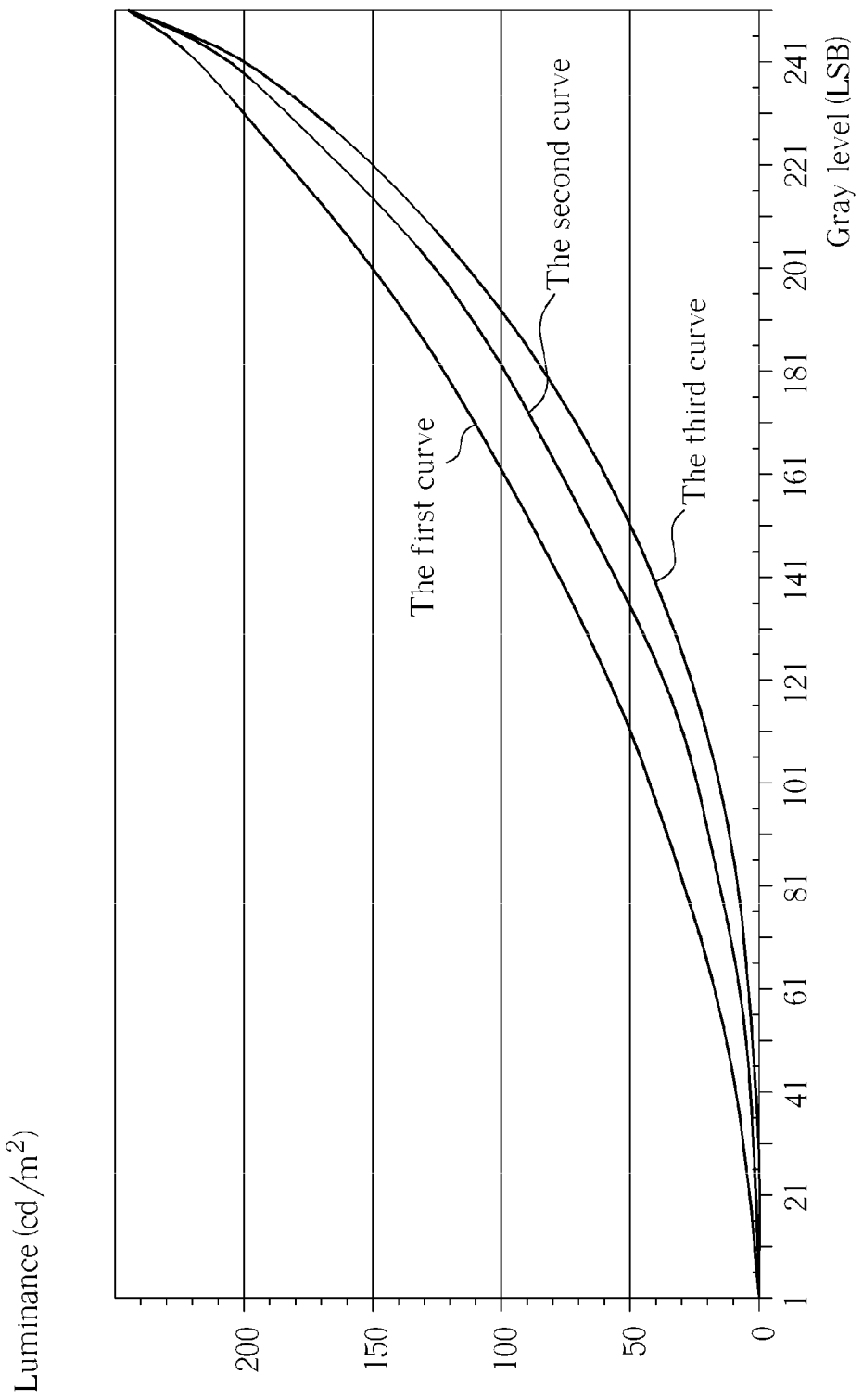
FIG. 1 illustrates three different luminance sensitivity curves of human eyes.
Figure 2:
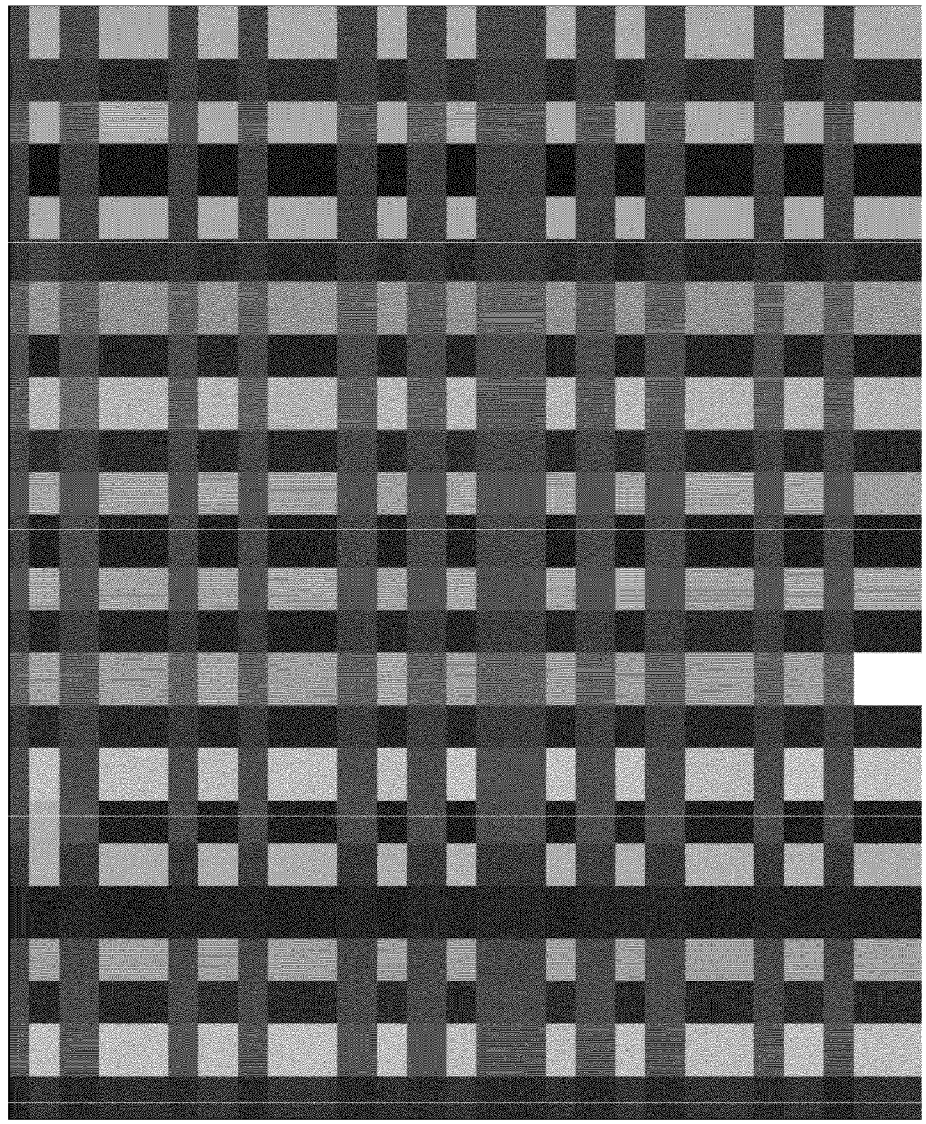
FIG. 2 is an image with FPN equal to 2.41%.
Figure 3:
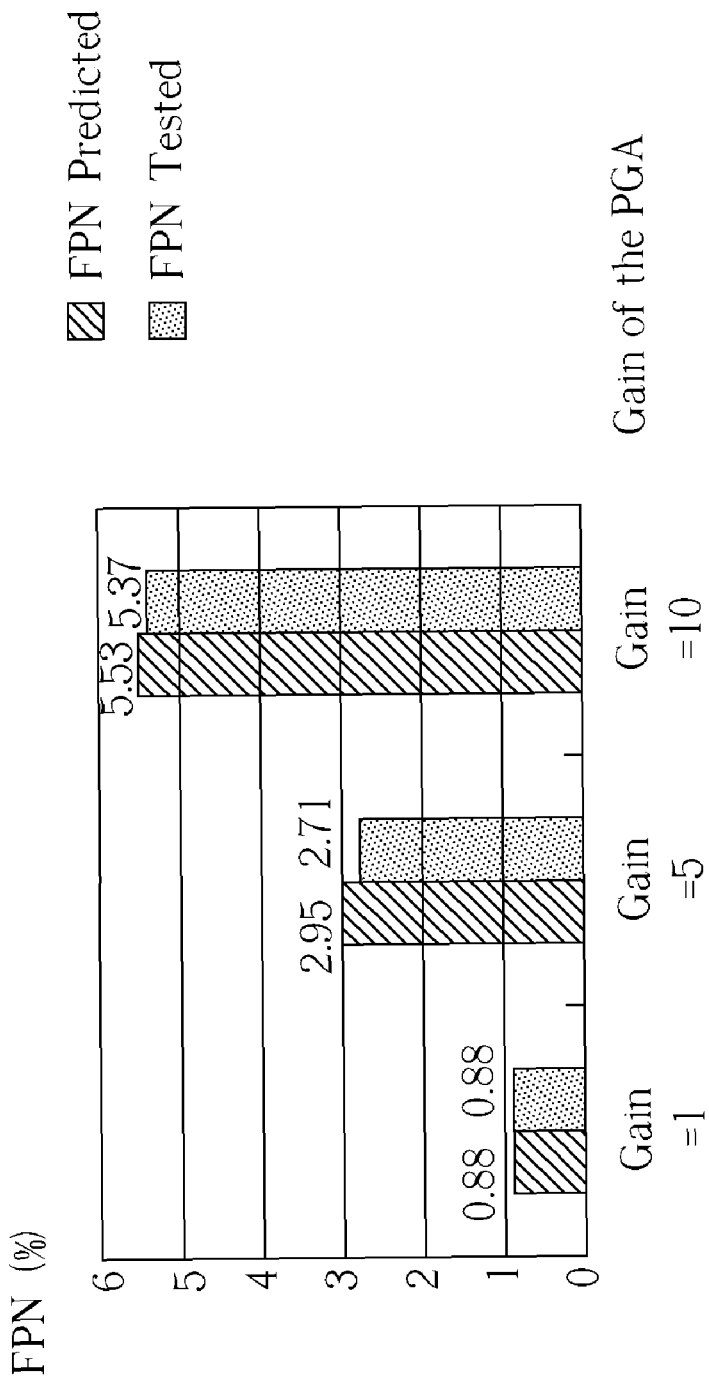
FIG. 3 is a bar chart illustrating the relations between a gain controlled by a PGA and FPNs.
Figure 4:
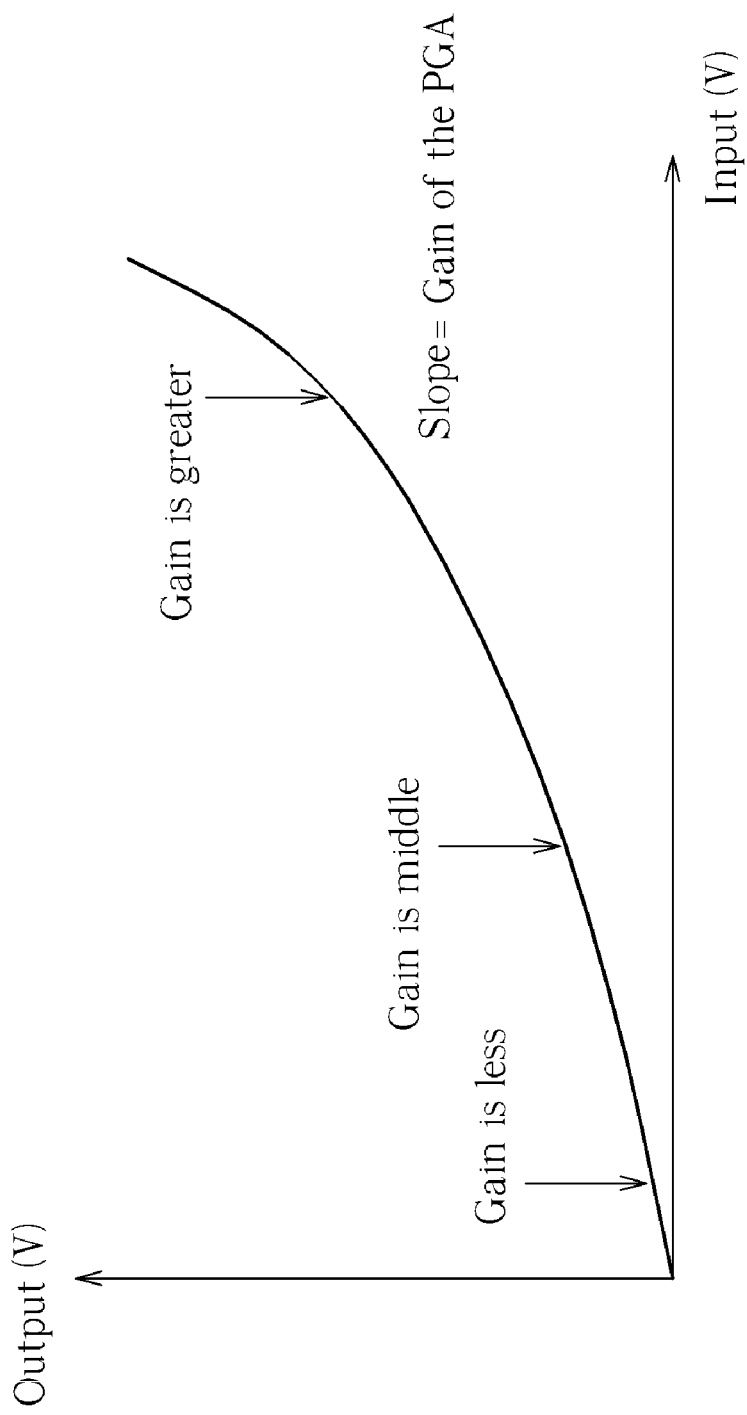
FIG. 4 illustrates the relationship between an input voltage and an output voltage amplified by a gain.

Apply the aforementioned visual theory to image processing: if an image frame is bright, increase the gain of the image frame; contrarily, if an image frame is obscure, then reduce the gain of the image frame. The gain is controlled by a PGA (Programmable Gain Amplifier). After the gain of the image frame is increased, the luminance, the color contrast, and the FPNs of the image frame are also increased; however, due to the high luminance of the image frame, the human eyes are not so susceptive to the differences of brightness produced by the FPNs in columns and rows, yet susceptive to the effect of the enhanced color contrast in the image frame. Inversely. If the gain of the image frame is reduced, the luminance, the color contrast, and the FPNs of the image frame are also decreased; however, due to the low luminance of the image frame, although the human eyes become sensitive to the differences of brightness produced by the FPNs in columns and rows, the FPNs have been lowered through the reduced gain. Hence, a person would sense a more colorful image frame when the luminance of the image frame is high, and sense a less noised image frame when the luminance of the image frame is low. Please refer to FIG. 3. FIG. 3 is a bar chart illustrating the relations between a gain controlled by a PGA and the FPNs. The vertical axis in FIG. 3 represents the percentage of the FPNs, and the horizontal axis in FIG. 3 represents the gain controlled by the PGA. In FIG. 3, each gain corresponds to two bars, one represents the predicted percentage of the FPNs, and the other represents the tested percentage of the FPNs. According to FIG. 3, the gain controlled by the PGA is proportional to the percentage of the FPNs. Next, please refer to FIG. 4. FIG. 4 illustrates the relationship between an input voltage and an output voltage amplified according to a gain. The slope of each point on the curve in FIG. 4 presents the gain controlled by a PGA, and the gains are generated according to the luminance sensitivity of human eyes. In brief, the darker the image frame becomes, the lower the gain is; the brighter the image frame is, the higher the gain becomes. FIG. 4 is the basis on which the look up table of the present invention is founded.

Figure 5:
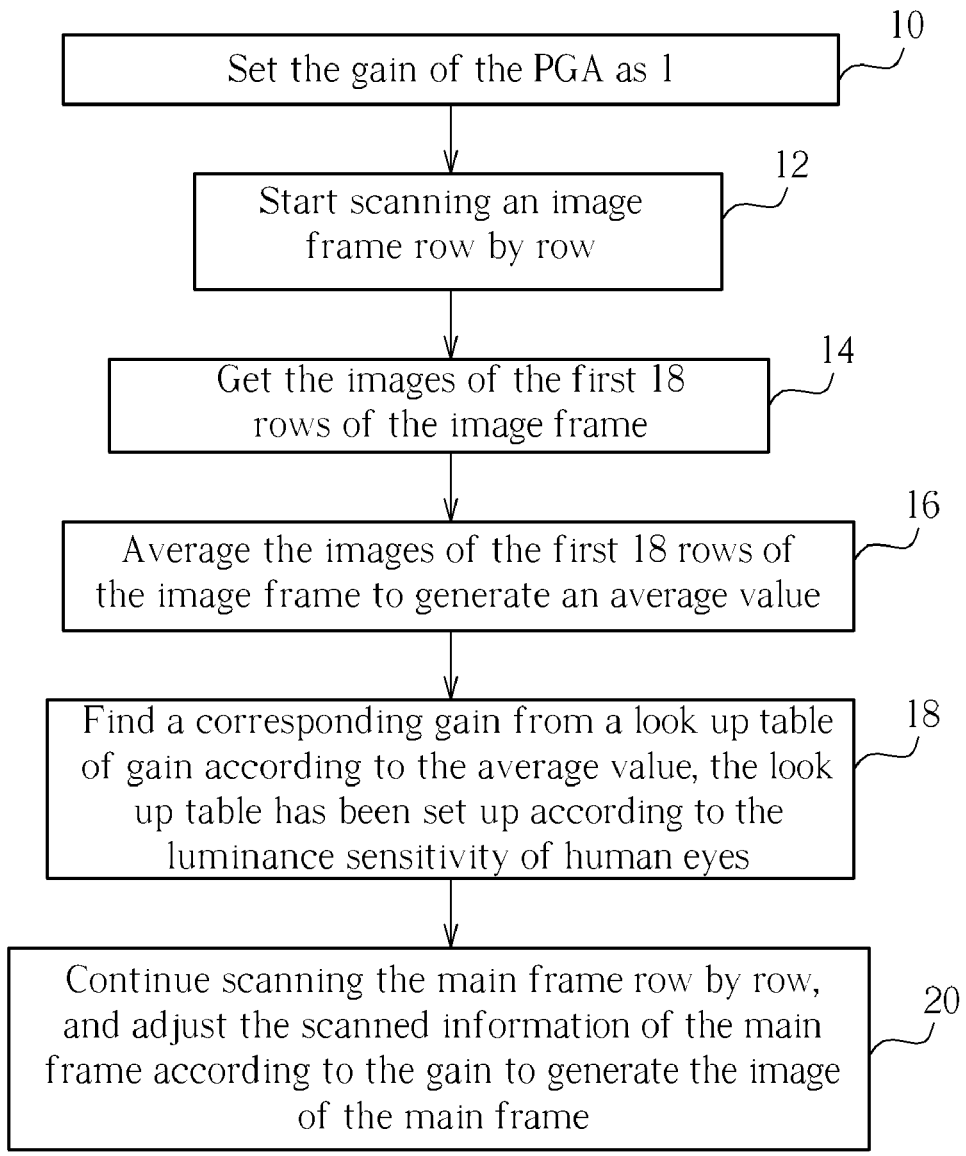
FIG. 5 is a flow chart for generating a gain of an image frame according to the first embodiment of the present invention.

Please refer to FIG. 5. FIG. 5 is a flow chart of generating a gain of an image frame according to the first embodiment of the present invention. The steps in FIG. 5 include:

Step 10: Set the gain of the PGA as 1;

Step 12: Start scanning an image frame row by row;

Step 14: Get the images of the first 18 rows of the image frame;

Step 16: Average the images of the first 18 rows of the image frame to generate an average value;

Step 18: Find a corresponding gain from a look up table of gain according to the average value, the look up table has been set up according to the luminance sensitivity of human eyes;

Step 20: Continue scanning the remaining rows of the image frame (the main frame) row by row, and adjust the scanned information of the main frame according to the gain to generate the image of the main frame.

In the first embodiment of the present invention, first set the gain of the PGA to 1 before scanning the image frame to make the scanned information of the image frame equivalent to the image of the image frame which is generated by multiplying the scanned information by the gain. Then start scanning the image frame row by row to generate the images of the first 18 rows. Please note, the first 18 rows (dummy rows) are chosen for illustrative purpose only, and are not meant to limit the scope of the present invention; the number of dummy rows for light-metering is determined according to many factors, such as the resolution of the image frame. "Dummy rows" are located on the edge of an image frame, the image information contained in the dummy rows cannot be used as the main frame due to the edge effect; however, it is good enough to be used as a reference of light-metering. The more the dummy rows are chosen, the closer the image information contained in the first 18 dummy rows is to the main frame; and as a result, the gain chosen from the look up table of gain will be more appropriate for the main frame. However, when more dummy rows are chosen, fewer rows of the main frame (the remaining rows of the image frame) are left, and the resolution of the main frame is consequently reduced. On the contrary, when fewer dummy rows are chosen, the image of the dummy rows is less consistent with the main frame; and as a result, the image frame cannot be adjusted as well according to the gain chosen from the look up table of gain. However, due to the increased row number of the main frame (the remaining rows of the image frame), the resolution of the main frame is improved. Hence, the number of dummy rows has to be carefully chosen to optimize the balance between the gain and the resolution of the main frame.

Subsequently, average the images of the first 18 rows of the image frame to generate an average value, and find a corresponding gain from the look up table of gain. Please note, the look up table of gain of the present invention is set up based on the luminance sensitivity of human eyes through a mathematical average method, such as a weighted average method. The look up table of gain is the optimized result of different curves based on the luminance sensitivity of human eyes, and gives a lower gain when the luminance of the image frame is lower, a higher gain when the luminance of the image frame is higher. As aforementioned, according to the gain, when the luminance of the image frame is low, the FPN is repressed, and when the luminance of the image frame is high, the FPN is raised but becomes difficult to be detected because the human eyes are less sensitive in such an environment. In the optical system of the present invention, there may be a plurality of the look up tables of gain, and each of them corresponds to a predetermined photo taking mode of the optical system, such as a night mode, a close-up mode, and an auto-shot mode. Then continue scanning the remaining rows of the image frame (the main frame) row by row, and adjust the information of the main frame received from performing the row-by-row scanning according to the corresponding gain to generate the image of the main frame. Please note that the example shown in FIG. 5 is for illustrative purpose only, and is not meant to limit the scope of the present invention; any rearrangement of steps which can provide the same result without deviating the spirits of the present invention is also within the scope of the present invention.

Figure 6:
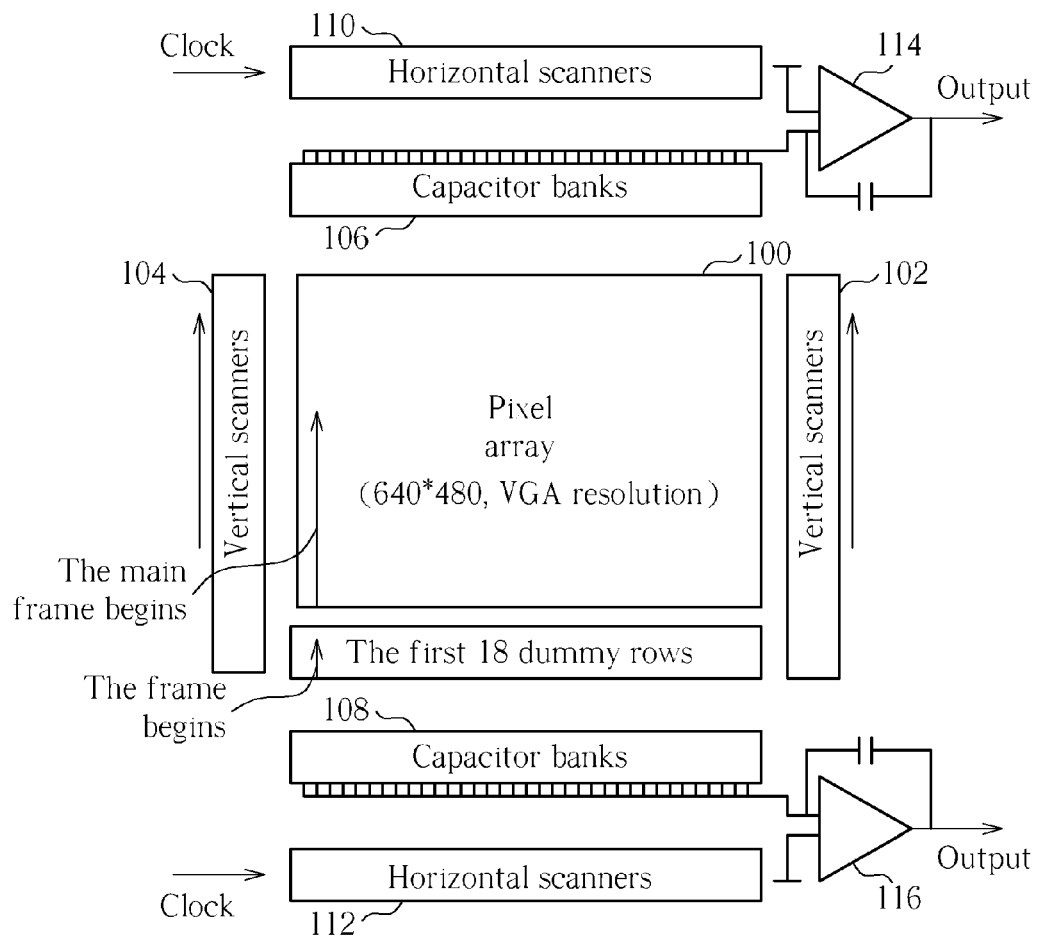
FIG. 6 is the circuitry diagram of the present invention.

Please refer to FIG. 6. FIG. 6 is the circuitry diagram of the present invention. The circuitry in FIG. 6 includes a 640*498 (VGA) pixel array 100, vertical scanners 102 and 104, capacitor banks 106 and 108, horizontal scanners 110 and 112, and PGAs 114 and 116. The vertical scanner 102 scans the pixel array 100 and dummy rows from bottom to top to get the information of the first 18 dummy rows of the image frame. The information of the first row is sent to the capacitor bank 106 for storage, then serially outputted to the PGA 114 through the horizontal scanner 110 according to the inputted clocks. The PGA 114 adjusts the inputted information of the first row, then outputs to other circuitry as the image of the first row of the image frame. After the image of the first row is outputted completely, the vertical scanner 102 begins to scan the information of the second row, and repeats the process until the information of the first 18 dummy rows are scanned. According to the first embodiment of the present invention, the gains controlled by the PGAs 114, 116 are set to 1 before scanning is performed, therefore, the scanned images of the image frame equal to the information of the image frame. After the information of the dummy rows of the image frame is outputted sequentially, the information of the dummy rows are averaged to generate an average value, as shown in step 16 in FIG. 5. Then a gain corresponding to the average value is generated from the look up table of gain. Afterwards, the vertical scanner keeps on scanning the main frame (the remaining rows of the image frame) from bottom to top, and outputs the information of the main frame to the PGA through the same process. Lastly the PGA adjusts the information of the main frame according to the gain and outputs the corresponding image of the main frame.

Figure 7:
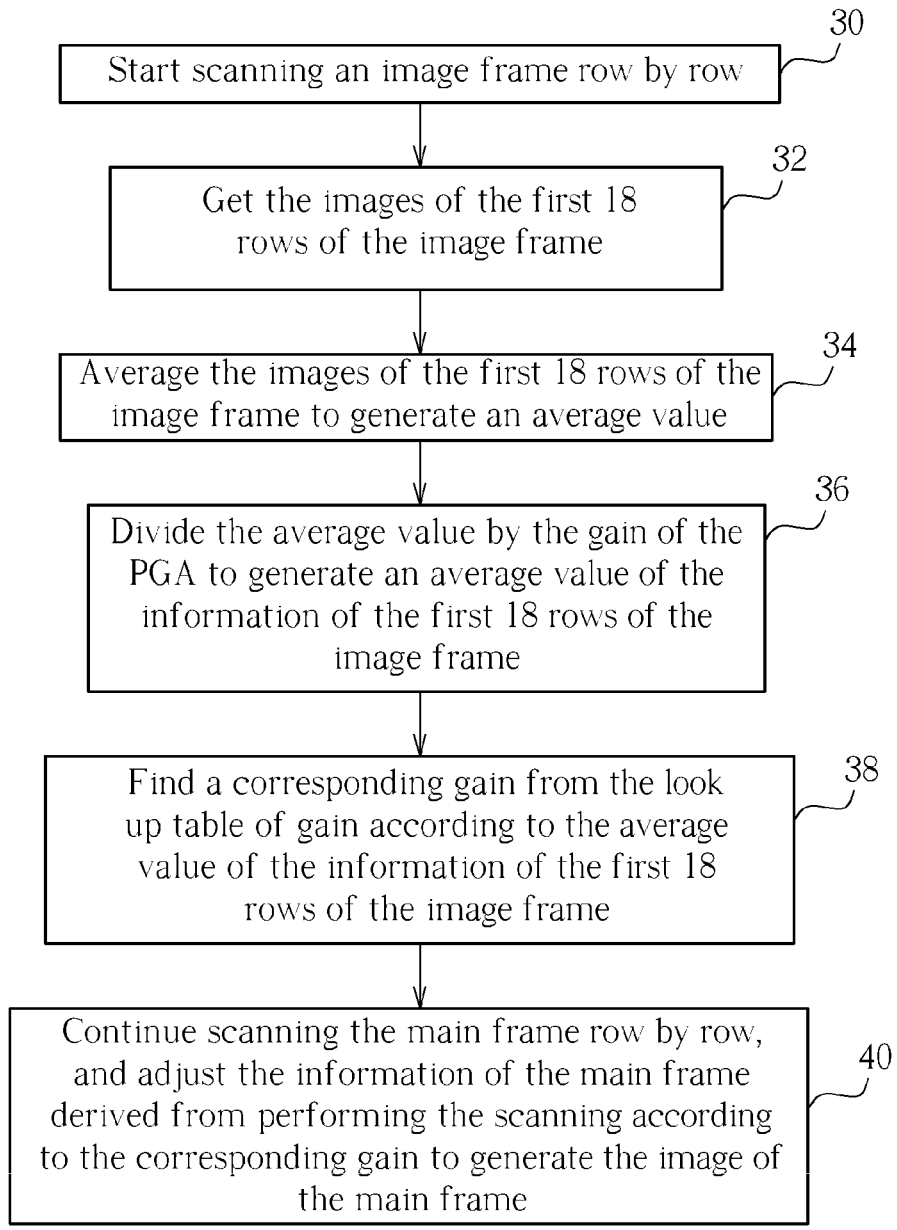
FIG. 7 is a flow chart of generating a gain of an image frame according to the second embodiment of the present invention.

If the PGA hasn't been set to 1 before scanning the image frame, the average value derived through averaging the images of the first 18 dummy rows should be divided by the gain of the PGA 114 to get the average value of the information of the first 18 dummy rows. After the average value of the information of the first 18 dummy rows is derived, find the corresponding gain from the look up table of gain. Then adjust the information of the main frame according to the corresponding gain to generate the image of the main frame. Please refer to FIG. 7. FIG. 7 is a flow chart of generating a gain of an image frame according to the second embodiment of the present invention.

Step 30: Start scanning an image frame row by row;

Step 32: Get the images of the first 18 rows of the image frame;

Step 34: Average the images of the first 18 rows of the image frame to generate an average value;

Step 36: Divide the average value by the gain of the PGA 114 to generate an average value of the information of the first 18 rows of the image frame;

Step 38: Find a corresponding gain from the look up table of gain according to the average value of the information of the first 18 rows of the image frame;

Step 40: Continue scanning the remaining rows of the image frame (the main frame) row by row, and adjust the information of the main frame derived from performing the scanning according to the corresponding gain to generate the image of the main frame.

Please note that the example shown in FIG. 7 is for illustrative purpose only, and is not meant to limit the scope of the present invention; any rearrangement of steps which can provide the same result without deviating the spirits of the present invention is also within the scope of the present invention.

The look up table of the present invention is set up not only based on the luminance sensitivity of human's eyes, but also based on how the microlenses are disposed above the pixel array of an LCD, the process etc. A microlens may be disposed above one pixel, above four pixels, or above other number of pixels. The process may be 0.13 um CMOS technology, 0.18 um CMOS technology, etc.

To sum up, the present invention provides a method utilizing the dummy rows of an image frame to get an average value, then finding a corresponding gain from the look up table of gain set up based on the luminance sensitivity of human eyes according to the average value, and lastly adjusting the information of the main frame to generate the image of the main frame according to the corresponding gain. This eliminates the need of an additional light-metering area or an additional image frame. Further the dummy rows and the main frame are in the same image frame, as a result, the scanned information of the dummy rows is generated real-time and appropriate for the main frame. Since the look up table is set up based on the luminance sensitivity of human eyes, the gain provided by the look up table can better adjust the main frame to facilitate the post-processing of the image of the main frame.

Those skilled in the art will readily observe that numerous modifications and alterations of the device and method may be made while retaining the teachings of the invention.

What is claimed is:

1. A method for generating a gain of an image frame comprising:
   setting the gain of the image frame to 1;
   scanning images of a plurality of beginning dummy rows of the image frame;
   averaging the images of the plurality of the beginning dummy rows of the image frame to generate an average value of the images of the plurality of the beginning dummy rows of the image frame;
   generating a corresponding gain according to the average value of the images of the plurality of the beginning dummy rows of the image frame; and
   generating an image of remaining rows of the image frame according to information of the remaining rows of the image frame and the corresponding gain.

2. The method of claim 1 wherein generating the corresponding gain according to the average value of the images of the plurality of the beginning dummy rows of the image frame is generating the corresponding gain from a look up table according to the average value of the images of the plurality of the beginning dummy rows of the image frame.

3. The method of claim 2 wherein the look up table corresponds to a predetermined operating mode of an optical system.

4. The method of claim 2 wherein the look up table is set up according to luminance sensitivity of human eyes.

5. The method of claim 1 wherein a lower average value of the images of the plurality of the beginning dummy rows of the image frame corresponds to a lower gain.

6. The method of claim 1 wherein a higher average value of the images of the plurality of the beginning dummy rows of the image frame corresponds to a higher gain.

7. The method of claim 1 wherein the image frame is an image frame displayed on an LCD TV.

8. The method of claim 1 wherein the image frame is an image frame displayed on an LCD panel of a digital still camera.

9. The method of claim 1 wherein generating the image of the remaining rows of the image frame according to the information of the remaining rows of the image frame and the corresponding gain is generating the image of the remaining rows of the image frame according to a product of the information of the remaining rows of the image frame and the corresponding gain.

* * * * *